Sept. 28, 1943.   W. E. SKELTON ET AL   2,330,754
ISOMERIZATION OF HYDROCARBONS
Filed Dec. 5, 1939
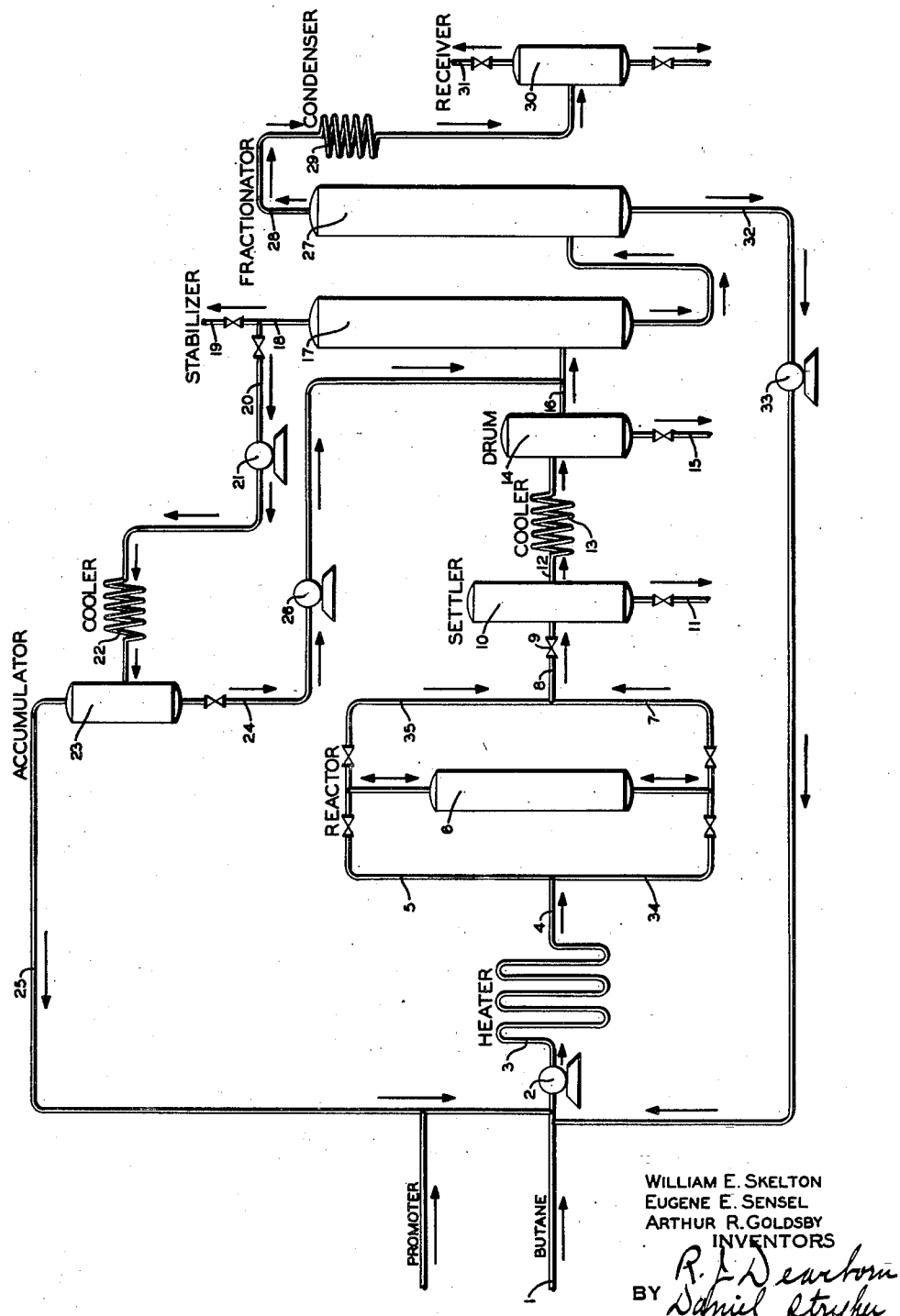
WILLIAM E. SKELTON
EUGENE E. SENSEL
ARTHUR R. GOLDSBY
INVENTORS
BY
THEIR ATTORNEYS Patented Sept. 28, 1943

2,330,754

UNITED STATES PATENT OFFICE 2,330,754

ISOMERIZATION OF HYDROCARBONS

William E. Skelton, Eugene E. Sensel, and Arthur R. Goldsby, Beacon, N. Y., assignors, by mesne assignments, to The Texas Company, New York, N. Y., a corporation of Delaware Application December 5, 1939, Serial No. 307,562

8 Claims. (Cl. 260—683.5)

This invention relates to the conversion of hydrocarbons and has to do with the isomerization of normal paraffins to isoparaffins.

Broadly, the invention contemplates effecting the conversion by subjecting a flowing stream of feed hydrocarbon or hydrocarbons to contact with a suitable conversion catalyst and alternately maintaining the stream in the gas and liquid phases.

More specifically, the invention comprises subjecting the hydrocarbon feed, while in gas phase, to contact with the catalyst and intermittently increasing the pressure in the reaction zone so that the hydrocarbon feed is maintained in liquid phase for a relatively short period of time.

The invention has particular application to the isomerization of normal paraffin hydrocarbons, such as butane, with a metallic halide catalyst, either with or without a promoter. The catalyst may be selected from one of a group consisting of the metallic halides. Anhydrous aluminum chloride and aluminum bromide are preferred catalysts. The invention is particularly applicable to the isomerization of normal butane to isobutane, in which reaction the rate of catalyst deterioration or complex formation is very low, although it may advantageously be applied to the isomerization of normal pentane or higher paraffin hydrocarbons or mixtures thereof, in the presence of a retarder of catalyst deterioration, such as isobutane, mixtures of normal butane and isobutane, or mixtures of propane and/or normal butane and/or isobutane.

The catalyst may be used in the form of lumps, or it may be disseminated on a support or carrier, such as activated alumina, coke, carbon, pumice, silica gel, brick, refractories, etc.

Suitable promoters comprise anhydrous hydrogen halides, such as hydrogen chloride, hydrogen bromide, and hydrogen iodide, or mixtures thereof, as well as various alkyl halides, such as methyl chloride, ethyl chloride, etc.

The promoter may be introduced in the gas phase directly to the reaction zone as such, or it may be generated in situ by the addition of water, steam, an oxygenated organic compound, such as an alcohol, or alkyl halides, such as tertiary butyl chloride. The use of aluminum chloride with hydrogen chloride is preferred.

An important object of the invention is to maintain the catalyst at a high degree of activity for a prolonged period of time so as to realize continuous operation with high catalytic efficiency.

During vapor phase isomerization deterioration of the catalyst occurs. For example, where the catalyst is aluminum chloride, deterioration occurs as a result of the formation of an aluminum chloride-hydrocarbon complex on the exposed surfaces of the aluminum chloride, usually at the charge inlet end of the reactor. The presence of this complex upon the particles or lumps of the catalyst tends to insulate the aluminum chloride from direct and complete contact with the hydrocarbon feed passing through the catalyst mass, reducing the yield per pass. Furthermore, such complex promotes undesirable reactions, such as cracking, which reduce the yield of desirable isoparaffin.

The purpose of the present invention is to effect removal of this complex, as well as other impurities, by subjecting the catalyst mass to an intermittent washing action with liquefied feed hydrocarbons. The washing is effected without discontinuing the conversion reaction. The impurities displaced by the feed hydrocarbons are carried along with the products of conversion, and subsequently removed from the system.

Advantageously, the direction of flow through the catalytic mass is reversed during the liquid phase operation. Formation and deposition of the complex occurs for the most part upon that portion of the catalyst mass with which the entering feed first comes into contact. Thus, reversing the direction of flow during the liquid phase operation avoids diffusing the impurity throughout the whole catalyst mass or bed.

In practice, the duration of liquid phase operation may be much less than the duration of vapor phase operation. For example, the gas phase operation may be continued without interruption for a substantial period of time, ranging from about one to ten days. Thereafter, the pressure within the reaction zone may be increased so as to maintain liquid phase conditions extending over a relatively short period of around one-half to twelve hours. The charge rate during the liquid phase operation may be the same as during the vapor phase operation, although it may advantageously be varied relative to the vapor phase charge rate.

In order to describe the invention more fully, reference will now be made to the accompanying drawing illustrating a flow diagram for the process of the invention.

Normal butane or a hydrocarbon mixture comprising essentially normal butane is charged through a pipe 1 to a pump 2 which forces the hydrocarbon feed through a heating coil 3 wherein it is heated to a temperature ranging around 150 to 250° F., but preferably around 200 to 220° F. The heating is effected under a pressure of about 150 to 215 pounds per square inch gauge, and such that the heated hydrocarbon feed is in the gas phase.

A promoter, such as hydrogen chloride gas, is injected into the suction side of the pump 2, or may be injected in the hydrocarbon stream prior to or subsequent to its passage through the heating coil 3. The amount of promoter added may be around 1 to 5% by weight of the normal butane charge.

The heated hydrocarbon feed is passed through pipe 4 and branch pipe 5 to the top of a reactor 6.

The reactor 6 advantageously comprises a tower-type vessel packed with the catalyst in solid or lump form so as to permit intimate contact between the hydrocarbon feed and the catalytic material. Suitable means, such as an internal cooling coil or external jacket, are provided for the reactor to absorb the heat of reaction and control the reaction temperature.

Conditions of temperature and pressure are now maintained within the reactor 6 such that conversion is effected while the hydrocarbons are in gas phase. The rate of gas flow through the reactor 6 is regulated so as to realize a contact time between butane and catalyst of about ½ to 10 minutes.

The reaction product comprising isobutane and unreacted normal butane, together with the hydrogen chloride promoter, is drawn off from the bottom of the reactor through a branch pipe 7 leading to a pipe 8 having a pressure control valve 9. The pipe 8 communicates with a settler 10 having a lower valved discharge 11 and an intermediate discharge line 12 communicating with a cooler 13. From the cooler the liquefied reaction product is conducted to a drum 14 having a bottom valved draw-off 15. From the drum 14 the reaction product is passed by line 16 to a stabilizer 17. Hydrogen halide present in the product is separated therefrom in the stabilizer and discharged, together with any fixed gases and some lower boiling hydrocarbons, through a pipe 18. These gases may be discharged from the system through valved pipe 19.

If desired, only a portion of the gases may be bled off through pipe 19 to prevent build-up of fixed gases in the system, and the balance of the gases leaving the stabilizer through pipe 18 may be subjected to cooling and condensing so as to effect recovery of hydrogen halide, which is recycled. This may be accomplished by drawing a portion of the gases through valved pipe 20 by compressor 21, which discharges through cooler 22 into an accumulator 23, where liquefied hydrocarbons are separated and removed by bottom valved draw-off 24 from remaining gaseous HCl and fixed gases which are recycled by line 25 to the charge line 1. The liquefied hydrocarbons containing some dissolved HCl, removed by line 24, may be recycled by pump 26 to the stabilizer 17, whereby the hydrocarbons are returned to the liquid reaction product and dissolved HCl removed by fractionation.

The liquid accumulating in the bottom of the stabilizer is passed to a fractionator 27. Conditions are maintained within the fractionator so as to fractionally separate the isobutane as an overhead fraction, which is withdrawn through a pipe 28, condenser coil 29, to a receiver 30. The pressure within the receiver 30 may be reduced slightly to permit weathering off any fixed gases through a valved pipe 31.

The unreacted butane, and any higher boiling liquid present, is condensed out in the bottom of the fractionator 27 and withdrawn therefrom through a pipe 32 and recycled by pump 33 to the charge line 1.

When the reactor has been operated under gas phase conditions for a predetermined length of time, the pressure is increased by adjusting the control valve 9. For example, the pressure in the reactor may be raised to about 250 to 275 pounds per square inch so as to maintain liquid phase conditions within the reactor.

During this period of operation the charging rate through the charge pump 2 may be advantageously increased to hasten the filling of the reactor 6 with liquid. Thus, the charge rate may be raised from about ten barrels per hour for the vapor phase operation to about twenty to thirty barrels per hour for this portion of the liquid phase operation.

While the direction of flow of hydrocarbon feed through the reactor 6 may be maintained the same during both gas and liquid phase operation, it is preferable to reverse it. Thus, at the commencement of liquid phase operation the hydrocarbon feed passing through the pipe 4 may be diverted from the branch pipe 5 to a branch pipe 34 leading to the bottom of the reactor 6. Simultaneously, the valve in the branch pipe 7 is closed, while that in a branch pipe 35 is opened so as to permit the products of reaction to leave the reactor 6 from the top thereof.

After the reactor has been substantially filled with liquid during the liquid phase operation with increased charge rate, it may then be advantageous to reduce the charge rate to the original value or even lower to provide increased contact time for the liquid phase conversion. The liquid isobutane and normal butane passing through the catalyst bed, particularly adjacent the outlet end of the reactor, wash the complex out of the reactor, apparently by a combined mechanical flushing action and the effect of solution, particularly on the aluminum chloride lumps supporting the complex.

The mixed reaction product and complex discharges from the reactor through pipes 35 and 8, which pipes are heated by any suitable means (not shown) to a temperature approximating the temperature of the reactor to prevent solidification of aluminum chloride within these pipes. The mixed product and complex then discharge into settler 10 where the bulk of the complex settles out and is discharged by line 11. The reaction product then passes by line 12 through cooler 13, which may be of the scroll chiller type, into auxiliary settler 14, where, due to the cooling of the product to about 60–120° F., any retained complex and precipitated aluminum chloride settles out and is removed by line 15. The complex removed by lines 11 and 15 can be disposed of as desired, as by treatment to recover the aluminum chloride or employment as such in other processes. The reaction product substantially free from complex and dissolved aluminum chloride then passes to stabilizer 17 for treatment in the manner described above.

The liquid phase operation is preferably continued until the bulk of the complex has been washed out of the reactor, which may be indicated by a substantial decrease in the amount of complex separating out in settlers 10 and 14. The liquid phase operation is then terminated by adjustment of valve 9, and reversing the flow by closing branched pipes 34 and 35 and opening branched pipes 5 and 7, when the vapor phase operation is repeated, as above described.

Thus, as described above, during gas phase operation the hydrocarbon feed passes downwardly through the reactor 6 and during liquid phase operation passes upwardly therethrough. However, these conditions may be reversed so that during gas phase operation the feed hydrocarbons pass upwardly through the reactor 6 and pass downwardly therethrough during liquid phase operation. In this latter case it may be advantageous to introduce the hydrocarbon charge for the liquid phase portion of the cycle at an intermediate portion of the catalyst bed above the zone of complex formation, instead of at the top as shown, to facilitate the washing action.

While a single reactor has been shown in the drawing, it is contemplated that two or more may be employed so that when it ultimately becomes necessary to repack a tower with fresh catalyst or to regenerate the spent catalyst the operation may be continued with the other or remaining towers.

Obviously many modifications and variations of the invention, as hereinbefore set forth, may be made without departing from the spirit and scope thereof, and therefore only such limitations should be imposed as are indicated in the appended claims.

We claim:

1. In the continuous isomerization of normal paraffin hydrocarbons by contact with a catalyst comprising a metallic halide, the steps comprising passing a hydrocarbon feed, consisting essentially of normal butane, in gas phase downwardly through a catalytic mass in a reaction vessel, maintaining the catalyst at a temperature of around 210 to 220° F. while under a pressure of around 150 to 215 pounds, intermittently increasing at substantially said conversion temperature the pressure to around 275 pounds for a relatively short time whereby the catalyst is subjected to washing with liquefied butane to remove impurities including metallic halide-hydrocarbon complex formed in the conversion reaction, and removing said impurities together with products of liquid phase conversion.

2. In the continuous isomerization of hydrocarbons by contact with a catalyst comprising a metallic halide, the method comprising passing the hydrocarbon feed in gas phase through the catalyst mass in a reaction vessel, subjecting the hydrocarbon feed to conversion therein, intermittently reversing the direction of flow of hydrocarbon feed through the mass, the feed hydrocarbon being in liquid phase during said reverse flow whereby impurities are washed from the catalyst, and removing said impurities together with products of liquid phase conversion.

3. In the continuous isomerization of hydrocarbons by contact with a catalyst comprising a metallic halide and wherein the hydrocarbon feed is passed through a catalyst mass in a reaction vessel under conditions of temperature such that conversion occurs, the method of prolonging catalyst activity which comprises intermittently reversing the direction of flow of hydrocarbon feed through the mass, maintaining the feed in gas phase during flow in one direction, while maintaining it in liquid phase during flow in the reverse direction whereby impurities accumulating upon the catalyst mass are washed therefrom during said liquid phase conversion, and removing said impurities together with the products of liquid phase conversion.

4. In the continuous isomerization of normal paraffin hydrocarbons by contact with an isomerization catalyst, the steps comprising passing normal butane in gas phase downwardly through a catalytic mass in a reaction vessel, maintaining the catalyst at a temperature of about 210 to 220° F. while under a pressure of about 150 to 215 pounds, at intervals increasing the pressure to about 275 pounds for a relatively short time, reversing the direction of flow of feed hydrocarbon through the catalyst during said intervals of increased pressure whereby the catalyst is subjected to washing with liquefied feed hydrocarbons to remove impurities, and removing said impurities together with products of liquid phase conversion.

5. In the continuous isomerization of normal paraffin hydrocarbons, the method comprising passing the hydrocarbon feed in gas phase through a mass of solid isomerization catalyst in a reaction vessel maintained at a conversion temperature such that there is substantial conversion to isoparaffins, subjecting the hydrocarbon feed to conversion therein, at intervals reversing the direction of flow of hydrocarbon feed through the mass for a relatively short period of time, the feed hydrocarbon being in liquid phase during said reverse flow whereby impurities are washed from the catalyst, continuing to effect conversion during said reverse flow, and removing said impurities together with products of liquid phase conversion.

6. In a continuous process for the conversion of hydrocarbons by contact with a solid aluminum halide conversion catalyst and during which conversion the catalyst surface becomes contaminated, at least in part, with aluminum halide-hydrocarbon complex formed in the reaction, the steps which comprise continuously passing hydrocarbons undergoing conversion in the gas phase through a mass of solid conversion catalyst in a reaction zone maintained at the reaction temperature, reversing the direction of flow of said hydrocarbons through the mass at intervals, continuing said reverse flow while the hydrocarbons are in substantially the liquid phase at the conversion temperature for a relatively short period of time so as to displace said complex along with products of conversion, and thereafter restoring the normal direction of hydrocarbon flow through the reaction zone.

7. In a continuous process for the conversion of hydrocarbons wherein conversion is effected during passage of the hydrocarbons through a bed of solid metallic halide isomerization catalyst in a reaction zone during which conversion the catalyst surface becomes contaminated at least in part with metallic halide-hydrocarbon complex formed in the reaction, the steps which comprise passing feed hydrocarbons in vapor phase through the catalyst bed maintained at a predetermined conversion reaction temperature, reversing the direction of hydrocarbon flow through the bed at intervals without substantially altering the temperature of the bed, increasing the pressure during said reversed flow sufficiently to maintain hydrocarbons undergoing conversion in the liquid phase, continuing the reversed flow for a relatively short period of time whereby the catalyst bed is subjected to washing with liquid to remove impurities including said complex, maintaining said predetermined conversion temperature during the reverse flow and removing said impurities together with products of liquid phase conversion from the reaction zone.

8. In a continuous process for the conversion of hydrocarbons wherein conversion is effected during passage of the hydrocarbons through a bed of solid metallic halide isomerization catalyst in a reaction zone during which conversion the catalyst surface becomes contaminated at least in part with metallic halide-hydrocarbon complex formed in the reaction, the steps which comprise passing feed hydrocarbons in vapor phase through a bed of solid aluminum halide catalyst maintained at a predetermined conversion reaction temperature in the range about 150 to 250° F., reversing the direction of hydrocarbon flow through the bed at intervals without substantially altering the temperature of the bed, increasing the pressure during said reversed flow sufficiently to maintain hydrocarbons undergoing conversion in the liquid phase, continuing the reversed flow for a relatively short period of time whereby the catalyst bed is subjected to washing with liquid to remove impurities including said complex, maintaining said predetermined conversion temperature during the reverse flow and removing said impurities together with products of liquid phase conversion from the reaction zone.

WILLIAM E. SKELTON.
EUGENE E. SENSEL.
ARTHUR R. GOLDSBY.